United States Patent
Hentati

(10) Patent No.: US 8,009,511 B2
(45) Date of Patent: Aug. 30, 2011

(54) PRESSURE WAVES DECOUPLING WITH TWO TRANSDUCERS

(75) Inventor: Nabil Hentati, Montingy le Bretonneux (FR)

(73) Assignee: Baker Hughes Incorporated, Houston, TX (US)

(*) Notice: Subject to any disclaimer, the term of this patent is extended or adjusted under 35 U.S.C. 154(b) by 915 days.

(21) Appl. No.: 11/837,213

(22) Filed: Aug. 10, 2007

(65) Prior Publication Data

US 2008/0037369 A1 Feb. 14, 2008

Related U.S. Application Data

(60) Provisional application No. 60/837,009, filed on Aug. 11, 2006.

(51) Int. Cl.
*E21B 47/14* (2006.01)
*E21B 47/18* (2006.01)
*G01V 3/00* (2006.01)

(52) U.S. Cl. ............................ 367/81; 367/83; 340/854.4

(58) Field of Classification Search .................. 340/855; 702/189–197
See application file for complete search history.

(56) References Cited

U.S. PATENT DOCUMENTS

| | | | |
|---|---|---|---|
| 3,716,830 A | 2/1973 | Garcia | 340/18 LD |
| 3,742,443 A * | 6/1973 | Foster et al. | 367/83 |
| 3,747,059 A | 7/1973 | Garcia | 340/18 LD |
| 4,262,343 A | 4/1981 | Claycomb | 367/83 |
| 4,590,593 A | 5/1986 | Rodneiy | 367/83 |
| 4,642,800 A | 2/1987 | Umeda | 367/85 |
| 4,692,911 A | 9/1987 | Scherbatskoy | 367/83 |
| 4,715,022 A | 12/1987 | Yeo | 367/83 |
| 5,113,379 A | 5/1992 | Scherbatskoy | 367/83 |
| 5,146,433 A | 9/1992 | Kosmala et al. | 367/83 |
| 5,467,320 A * | 11/1995 | Maki, Jr. | 367/40 |
| 5,969,638 A | 10/1999 | Chin | 340/855.3 |
| 6,421,298 B1 * | 7/2002 | Beattie et al. | 367/83 |
| 6,626,253 B2 | 9/2003 | Hahn et al. | 175/48 |
| RE38,567 E | 8/2004 | Gruenhagen | 340/679 |
| 7,158,446 B2 * | 1/2007 | Gardner et al. | 367/81 |
| 2002/0180613 A1 * | 12/2002 | Shi et al. | 340/853.1 |
| 2006/0098531 A1 | 5/2006 | Gardner et al. | |
| 2006/0132327 A1 | 6/2006 | Reckmann et al. | |
| 2007/0177461 A1 * | 8/2007 | Marsh | 367/81 |
| 2007/0177467 A1 * | 8/2007 | Ando et al. | 369/13.01 |

FOREIGN PATENT DOCUMENTS

| | | | |
|---|---|---|---|
| GB | 2361789 A | | 10/2001 |
| GB | 2361789 A | * | 10/2001 |
| WO | WO0166912 A | | 9/2001 |

* cited by examiner

*Primary Examiner* — Brian A Zimmerman
*Assistant Examiner* — Jerold Murphy
(74) *Attorney, Agent, or Firm* — Mossman Kumar & Tyler PC

(57) ABSTRACT

A telemetry system for communication in a borehole uses two spaced-apart transducers. The outputs from the two transducers are filtered to decoupled tool signals traveling in opposite directions. One of the two signals may be it telemetry signal while other signal may be pump noise.

12 Claims, 8 Drawing Sheets

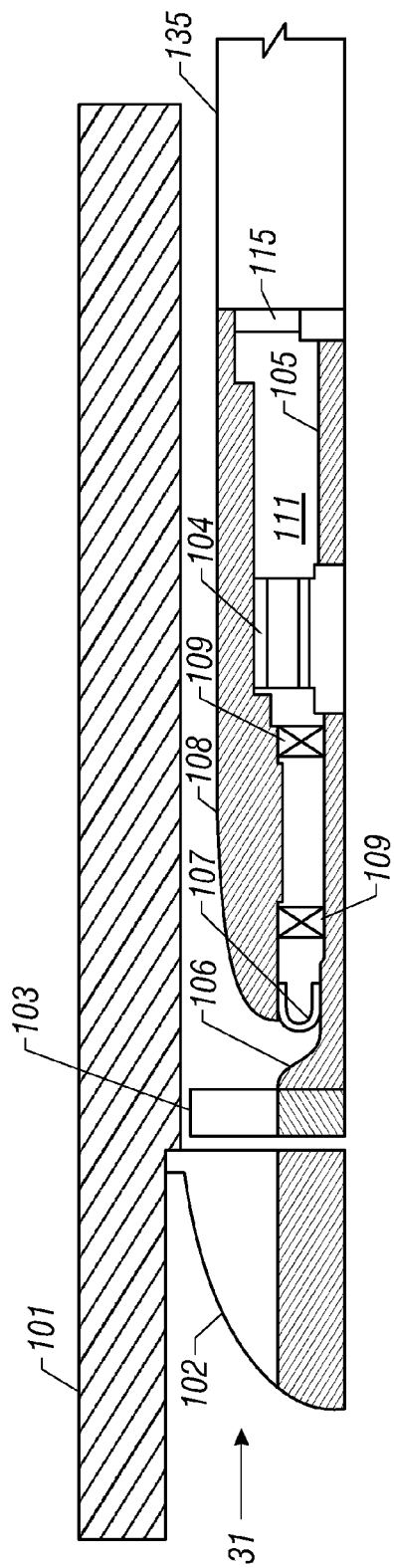
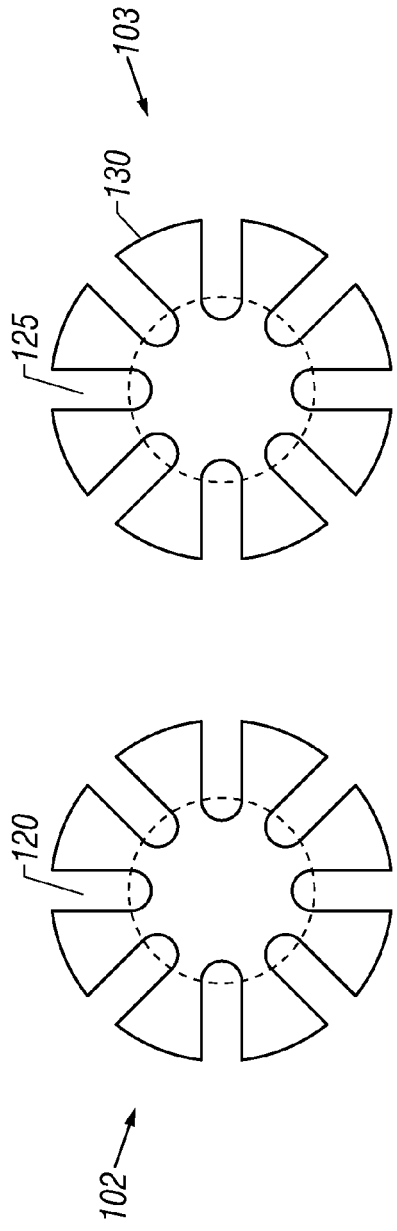
FIG. 2A
(Prior Art)
FIG. 2B
(Prior Art)
FIG. 2C
(Prior Art)

PRESSURE WAVES DECOUPLING WITH TWO TRANSDUCERS

CROSS-REFERENCES TO RELATED APPLICATIONS

This application claims priority from U.S. Provisional Patent Application Ser. No. 60/837,009 filed on Aug. 11, 2006.

BACKGROUND OF THE DISCLOSURE

1. Field of the Disclosure

The present disclosure relates to telemetry systems for communicating information from a downhole location to a surface location, and, more particularly, to a method of removing noise at the surface location produced by surface sources.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameters include logging data such as resistivity of the various layers, sonic density, porosity, induction, self potential and pressure gradients. This information is critical to efficiency in the drilling operation.

In Measurement-While-Drilling (MWD), testing devices are lowered into a borehole in an assembly that in includes a drilling apparatus and measurements are taken alongside the drilling. This saves time that would be otherwise lost to switching out the drilling apparatus with measuring equipment. On the other hand, the obtained data generally must be transmitted to the surface for the benefit of engineering and technicians operating the equipment. MWD telemetry is typically used to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the borehole assembly (BHA) that can generate pressure fluctuations in the mud stream. The surface receiver system consists of sensors that measure the pressure fluctuations and/or flow fluctuations, and signal processing modules that interpret these measurements.

Down-linking is achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn '253 is an anti-plugging oscillating shear valve system for generating pressure fluctuations in a flowing drilling fluid. The system includes a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

U.S. RE38,567 to Gruenhagen et al., having the same assignee as the present disclosure and the contents of which are fully incorporated herein by reference, and U.S. Pat. No. 5,113,379 to Scherbatskoy teach methods of downlink telemetry in which flow rate is controlled using a bypass-actuator and controller.

Drilling systems (described below) include mud pumps for conveying drilling fluid into the drillstring and the borehole. Pressure waves from surface mud pumps produce considerable amounts of noise. The pump noise is the result of the motion of the mud pump pistons. The pressure waves from the mud pumps travel in the opposite direction from the uplink telemetry signal. Components of the noise waves from the surface mud pumps may be present in the frequency range used for transmission of the uplink telemetry signal and may even have a higher level than the received uplink signal, making correct detection of the received uplink signal very difficult. Additional sources of noise include the drilling motor and drill bit interaction with the formation. All these factors degrade the quality of the received uplink signal and make it difficult to recover the transmitted information.

There have been numerous attempts to find solutions for reducing interfering effects in MWD telemetry signals. U.S. Pat. Nos. 3,747,059 and 3,716,830 to Garcia teach methods of reducing the effect of mud pump noise wave reflecting off the flexible hose; other reflections or distortions of the noise or signal waves are not addressed.

U.S. Pat. No. 3,742,443 to Foster et al. teaches a noise reduction system that uses two spaced apart pressure sensors. The optimum spacing of the sensors is one-quarter wavelength at the frequency of the telemetry signal carrier. The signal from the sensor closer to the mud pumps is passed through a filter having characteristics related to the amplitude and phase distortion encountered by the mud pump noise component as it travels between the two spaced points. The filtered signal is delayed and then subtracted from the signal derived from the sensor further away from the mud pumps. The combining function leads to destructive interference of the mud pump noise and constructive interference of the telemetry signal wave, because of the one-quarter wavelength separation between the sensors. The combined output is then passed through another filter to reduce distortion introduced by the signal processing and combining operation. The system does not account for distortion introduced in the telemetry signal wave as it travels through the mud column from the downhole transmitter to the surface sensors. The filter on the combined output also assumes that the mud pump noise wave traveling from the mud pumps between the two sensors encounters the same distortion mechanisms as the telemetry signal wave traveling in the opposite direction between the same pair of sensors. This assumption does not, however, always hold true in actual MWD systems.

U.S. Pat. No. 4,262,343 to Claycomb discloses a system in which signals from a pressure sensor and a fluid velocity detector are combined to cancel mud pump noise and enhance the signal from downhole. U.S. Pat. No. 4,590,593 to Rodney discloses a two sensor noise canceling system similar Garcia '059, Garcia '830, and Foster '443, but with a variable delay. The delay is determined using a least mean squares algorithm during the absence of downhole data transmission. U.S. Pat. No. 4,642,800 issued to Umeda discloses a noise-reduction scheme that includes obtaining an "average pump signature" by averaging over a certain number of pump cycles. The assumption is that the telemetry signal is not periodic with the same period as the pump noise and, hence, will average to zero. The pump signature is then subtracted from the incoming signal to leave a residual that should contain mostly telemetry signal. U.S. Pat. No. 5,146,433 to Kosmala et al. uses signals from position sensors on the mud pumps as inputs to a system that relates the mud pump pressure to the position of the pump pistons. Thus, the mud pump noise signature is predicted from the positions of the pump pistons. The predicted pump noise signature is subtracted from the received signal to cancel the pump noise component of the received signal.

U.S. Pat. No. 4,715,022 to Yeo discloses a signal detection method for mud pulse telemetry systems using a pressure transducer on the gas filled side of the pulsation dampener to improve detection of the telemetry wave in the presence of mud pump noise. One of the claims includes a second pressure transducer on the surface pipes between the dampener and the drill string and a signal conditioner to combine the signals from the two transducers. Yeo does not describe how the two signals may be combined to improve signal detection.

U.S. Pat. No. 4,692,911 to Scherbatskoy discloses a scheme for reducing mud pump noise by subtracting from the received signal, the signal that was received T seconds previously, where T is the period of the pump strokes. The received signal comes from a single transducer. A delay line is used to store the previous noise pulse from the mud pumps, and this is then subtracted from the current mud pump noise pulse. This forms a comb filter with notches at integer multiples of the pump stroke rate. The period T of the mud pumps may be determined from the harmonics of the mud pump noise, or from sensors placed on or near the mud pumps. The telemetry signal then needs to be recovered from the output of the subtraction operation (which includes the telemetry signal plus delayed copies of the telemetry signal).

U.S. Pat. No. 5,969,638 to Chin discloses a signal processor for use with MWD systems. The signal processor combines signals from a plurality of signal receivers on the standpipe, spaced less than one-quarter wavelength apart to reduce mud pump noise and reflections traveling in a downhole direction. The signal processor isolates the derivative of the forward traveling wave, i.e., the wave traveling up the drill string, by taking time and spatial derivatives of the wave equation. Demodulation is then based on the derivative of the forward traveling wave. The signal processor requires that the signal receivers be spaced a distance of five to fifteen percent of a typical wavelength apart.

All the aforementioned prior art systems are attempting to find a successful solution that would eliminate a substantial portion or all of the mud pump noise measured by transducers at the surface and, in so doing, improve reception of telemetry signals transmitted from downhole. Some of these systems also attempt to account for reflected waves traveling back in the direction of the source of the original waves. However, none provide means for substantially reducing mud pump noise while also dealing with distortion caused by the mud channel and reflected waves.

U.S. application Ser. No. 10/203,367 of Jeffryes et al. describes a method for telemetry using a reflector positioned downstream from drilling mud pumps. The reflector causes reflected pressure waves having the same pressure polarity as incident pressure waves traveling upwards. A pressure wave incident on the reflector is more easily detected on the downstream side of the reflector. At least one pressure sensor is positioned below the reflector to sense pressure in the drilling fluid.

GB 2361789 to Tennent et al. teaches a receiver and a method of using the receiver for use with a mud-pulse telemetry system. The receiver comprises at least one instrument for detecting and generating signals in response to a telemetry wave and a noise wave traveling opposite the telemetry wave, the generated signals each having a telemetry wave component and a noise wave component. A filter receives and combines the signals generated by the instruments to produce an output signal in which the noise wave component is filtered out. An equalizer reduces distortion of the telemetry wave component of the signals. The teachings of Tennent include correcting for a plurality of reflectors that, in combination with the uplink and mud pump signals, affect that received signals. In essence, Tennent determines a transfer function for the mud channel in both directions. Determination of these transfer functions is difficult when both the mud pump and the downhole pulser are operating. The present disclosure addresses this difficulty with a simple solution.

SUMMARY OF THE DISCLOSURE

One embodiment of the disclosure is a method of communicating through a fluid in a borehole between a first location and a second location. The method includes producing a first signal at the first location and a second signal at the second location, the first and second signals traveling in opposite directions between a first position and a second position in the borehole. The method further includes measuring a third signal at the first position indicative of the first and second signals, and measuring a fourth signal at the second position indicative of the first and second signals, and combining a filtered output of the third signal with a filtered output of the fourth signal and estimating a value of the first signal at least one frequency. Estimating the value of the first signal may further include applying a first filter to the third signal and applying a second filter and a third filter to the fourth signal, and estimating the value of the second signal may be done by applying the first filter and a second filter to the third signal and applying the third filter to the fourth signal. The at least one frequency may include a plurality of frequencies defining a frequency band. The second filter may have a phase that is substantially linear function of frequency. The third filter may have a phase shift substantially equal to $\pi$. The first and second positions may be at or near a surface location, the second signal may include a pump noise and the first signal may include an uplink telemetry signal. The first position and the second position may be on a bottomhole assembly, and the first signal may comprise a downlink telemetry signal and the second signal may include drilling noise.

Another embodiment of the disclosure is an apparatus for communicating through a fluid in a borehole between a first location and a second location. The apparatus includes a first signal source configured to produce a first signal at the first location or and a second signal source configured to produce a second signal at the second location, the first signal and the second signal traveling in opposite directions between a first position and a second position in the borehole. The apparatus further includes a first transducer configured to produce a third signal at the first position indicative of the first and second signals, and a second transducer configured to produce a fourth signal at the second position indicative of the first and second signals. The apparatus further includes a processor configured to combine a filtered output of the third signal with a filtered output of the fourth signal and estimate a value of the first signal at least one frequency, and record the estimated value of the first signal on a suitable medium. The processor may be configured to estimate value of the first signal by applying a first filter to the third signal and applying a second filter and a third filter to the fourth signal, and estimate of value of the second signal by applying the first filter and a second filter the third signal and applying the third filter to the fourth signal. The processor may be for the configured to estimate the first and second signals at a plurality of frequencies. The second filter may have a phase that is substantially linear function of frequency. The third filter may have a phase shift of substantially equal to $\pi$. the first and second positions may be at or near a surface location, and second signal source may comprise a pump, and a first signal source may comprise a valve which generates an uplink signal. The first and second positions may be on a bottomhole assembly, the first signal source may include a downlink telemetry signal, and a second signal source may include a rotating drillstring.

Another embodiment of the disclosure is a computer-readable medium for use in an apparatus communicating through a fluid in a borehole between a first location and a second location. The apparatus includes a first signal source configured to produce a first signal at the first location and a second signal source configured to produce a second signal at the second location, the first signal and the second signal traveling in opposite directions between a first position and a second position in the borehole. The apparatus includes a first transducer configured to produce a third signal at the first position indicative of the first and second signals and a second transducer configured to produce a fourth signal at the second position indicative of the first and second signals. The medium includes instructions which enable a processor to combine a filtered output of the third signal with a filtered output of the fourth signal and estimate a value of the first signal at least one frequency and record the estimated value of the flow signal on a suitable medium. The medium may include a ROM, an EPROM, an EEPROM, a flash memory, and/or an Optical disk.

BRIEF DESCRIPTION OF THE DRAWINGS

The present disclosure is best understood with reference to the accompanying figures in which like numerals earth referred to like elements and:

FIGS. 2A-C (Prior Art) is a schematic view of a typical pulser assembly used for mud pulse telemetry, a stator element of the pulser assembly, and a rotor element of the pulser assembly;

DETAILED DESCRIPTION OF THE DISCLOSURE

Figure 1:
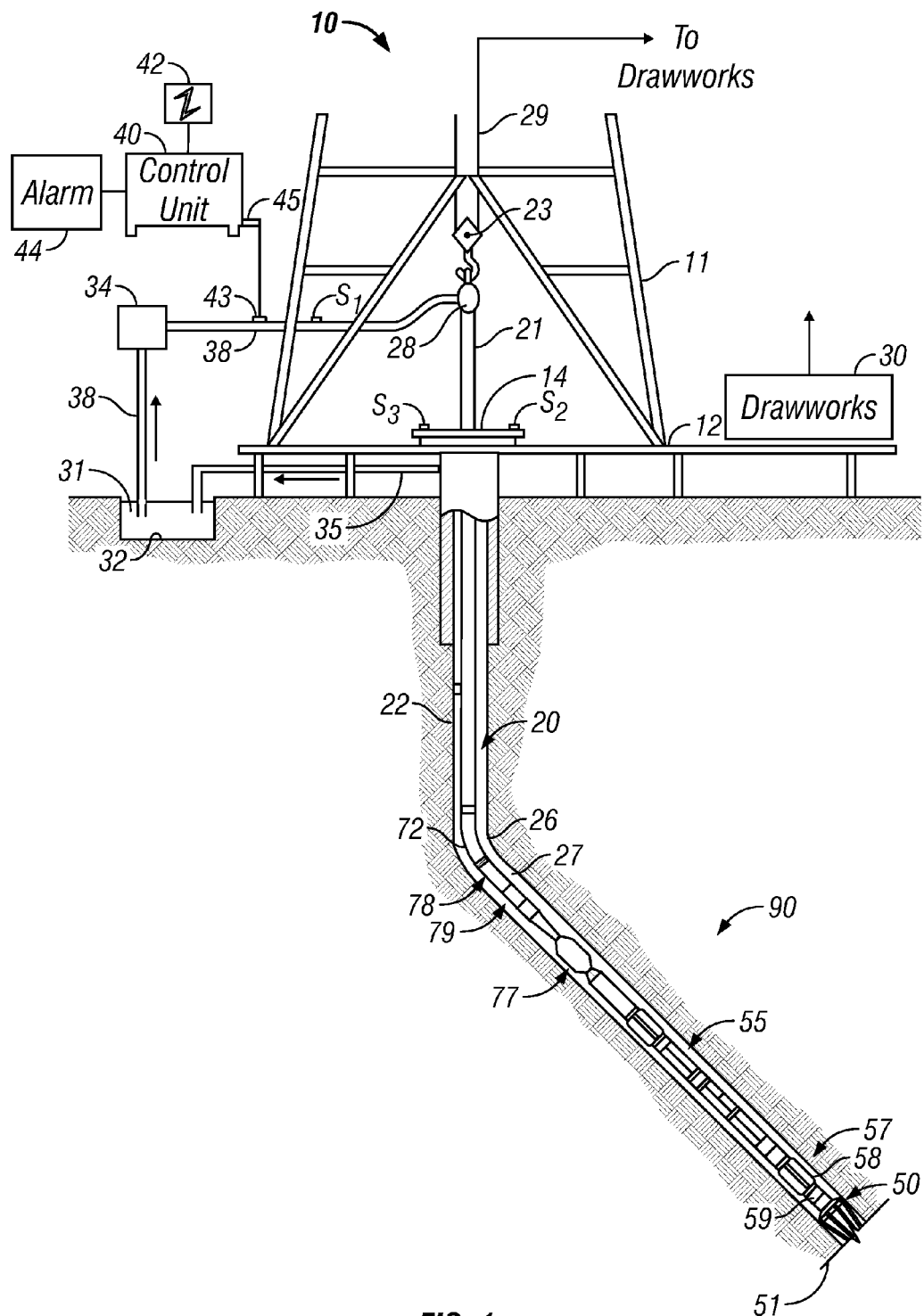
FIG. 1 (Prior Art) shows a schematic diagram of a drilling system with a drillstring carrying a drilling assembly conveyed in a wellbore for drilling the wellbore.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

FIG. 2A is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2A and 2B, is fixed with respect to the tool housing 101 and to the pulser housing 108 and has multiple lengthwise flow passages 120. The rotor 103, see FIGS. 2A and 2C, is disk shaped with notched blades 130 creating flow passages 125 similar in size and shape to the flow passages 120 in the stator 102. Alternatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103. As an example, with eight flow openings on the rotor 103 and on the stator 102, an angular displacement of approximately 22.5° is used to create the pressure drop. This keeps the actuation energy relatively small at high pulse frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one embodiment of the disclosure, the tool housing 101 has pressure sensors, not shown, mounted in locations above and below the pulser assembly, with the sensing surface exposed to the fluid in the drill string bore. These sensors are powered by the electronics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

Figure 3:
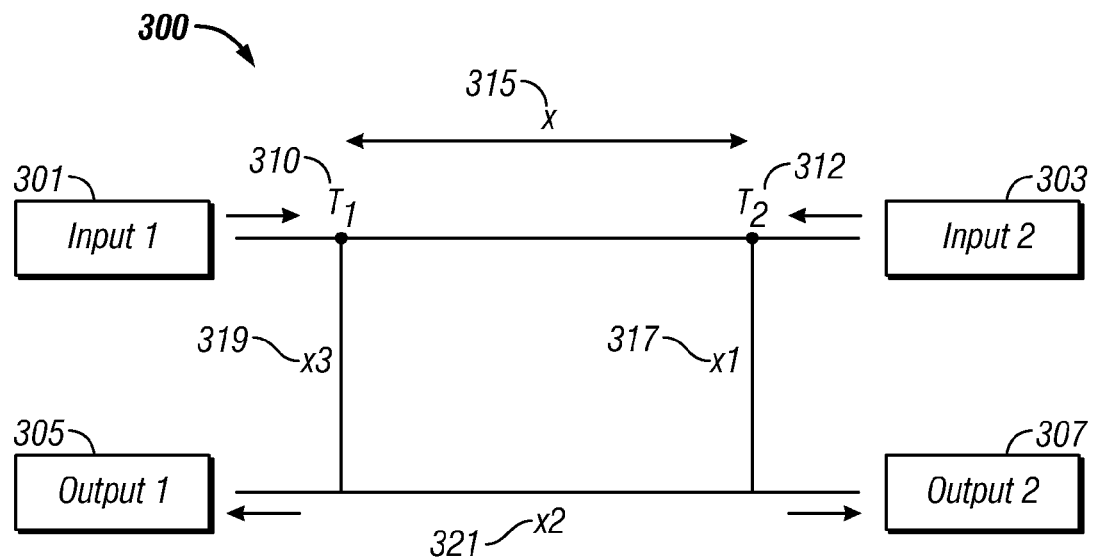
FIG. 3 illustrates an exemplary pressure wave decoupler in one embodiment of the present disclosure.

FIG. 3 illustrates exemplary pressure wave decoupler 300 in one embodiment of the present disclosure. The decoupler includes an input1 301, an input2 303, an output1 305 and an output2 307. The input1 generally provides a signal wave to be determined at one or more of the outputs, and may be implemented, for example, as a pulser used downhole for MWD purposes and thereby provides a (signal) wave traveling from the pulser to the surface. Input2 provides a second wave, generally noise, that may be implemented, for example, as a source such as a mud pump of a drilling platform at the surface of an MWD operation that provides a (noise) wave traveling in the opposite direction (downhole) as the pulser wave. Input1 and input2 are collinear along line 315, which may be a substantially common line of propagation of waves from the two inputs 301 and 303. Two transducers T1 310 and T2 312 are substantially located along line 315 between the two inputs 301 and 303 and are separated from each other at a distance x. The transducers may be used for example to convert a pressure signal into an electrical signal. Each transducer may be situated at one end of a bar, such as bars 317 and 319. Bar 317 provides delay x1 and bar 319 provides delay x3. The ends of the bars distal to the transducers are attached to bar 321 at attachment points which are separated by delay x3, such that the delay between a wave at the two points of attachment is characterized by x2.

Input1 and Input2 provide waves travel in opposite directions along line 315. The first (signal) wave travels from input1 to input2, and the second (noise) wave travels from input2 to input1. These waves are coupled along line 315. The coupled waves are detected at transducers T1 and T2 and decoupled at output1 and output2. For transducers separated by a distance x, the phase deviation of the wave from T1 to T2 is $2\pi x/\lambda$, where $\lambda$ is the wavelength defined by the equation $\lambda=c/f$ in which c is the wave velocity and f is the wave frequency. The waves are decoupled at output1 and output2 by selecting appropriate delays along paths x1 317, x3 319, and x2 321.

To decouple the input1 wave from input 2 wave at the output1, the condition of Eq. (1) must be satisfied:

$$x + x3 - (x1 + x2) = \frac{\lambda}{2} + n\lambda \quad \text{Eq. (1)}$$

When Eq. (1) is satisfied, the noise contribution from input2 vanishes at the output1. The output1 then may observe only the signal component (at the considered frequency) from the input1. For a fixed distance x between the transducers T1 and T2, the delays corresponding to paths x3 and (x1+x2) may be adjusted to accommodate different wavelengths or frequencies.

A wave from input1 may take one of two possible paths to arrive at output1. One signal travels from input1 to output1 along paths x, $x_1$, and $x_2$. The other signal travels along path x3. Thus, one signal arrives at output1 with a delay corresponding to $x+x_1+x_2$ and the other signal arrives at output1 with a delay corresponding to x3. The phase difference $\Delta\phi$ between the two signals arriving along different paths is:

$$\Delta\phi = \frac{2\pi}{\lambda}(x + x_1 + x_2 - x_3) \quad \text{Eq. (2)}$$

Using the condition of Eq. (1) and substituting x0=x1+x2, the phase difference may be written as:

$$\Delta\phi = \frac{2\pi}{\lambda}(x - (x_3 - x_0)) \quad \text{Eq. (3)}$$
$$= \frac{2\pi}{\lambda}\left(x - \left(\frac{\lambda}{2} + n\lambda - x\right)\right)$$
$$\Rightarrow \Delta\phi = \pi\left(4\frac{x}{\lambda} - 1\right)$$

As is well known, the signal amplitude at output1 is maximal when the two signals are in phase. This occurs when $$\Delta\phi = 2k\pi, k=0, 1, 2, \ldots \quad \text{Eq. (4)}$$

Similarly, noise waves from input2 may travel along two different paths (x+x3 and x1+x2) to contribute to the noise wave arriving at output1. This noise contribution to output1 from input2 substantially vanishes when the condition of Eq. (1) is satisfied.

Figure 4:
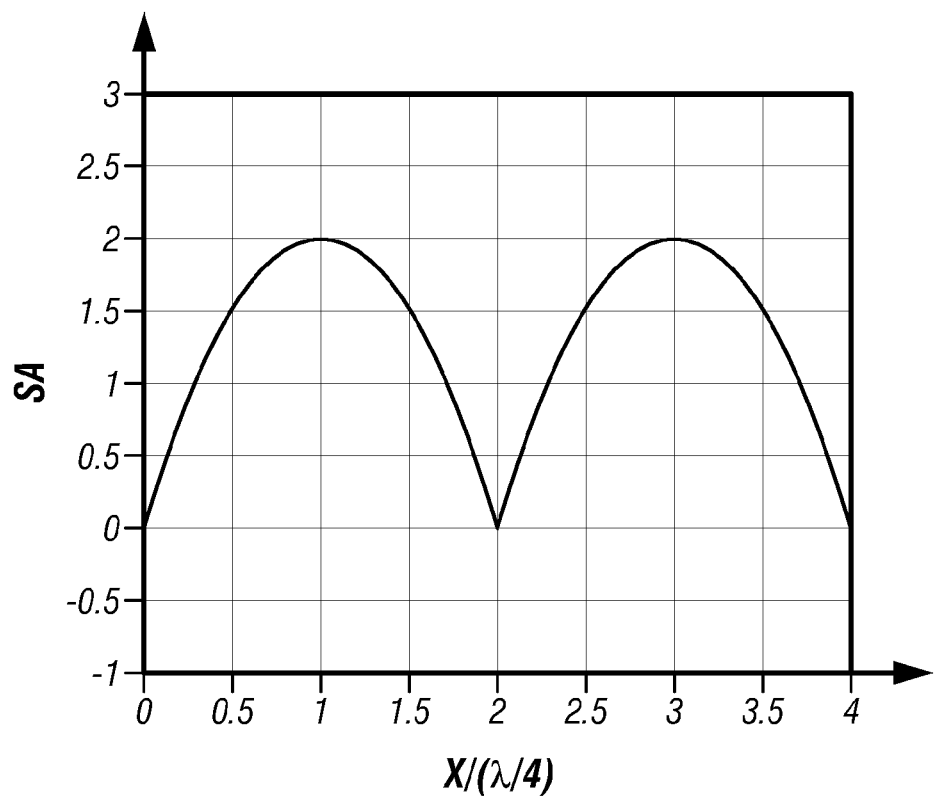
FIG. 4 shows a graph of an output signal amplitude versus phase due to use of an exemplary decoupler of the present disclosure.

FIG. 4 shows a graph of signal amplitude at output1 versus phase assuming no signal attenuation through the decoupler. With Eq. (1) satisfied (no noise at output1), the amplitude of the signal part (SA) at input1 may be written as:

$$SA = [1 + e^{j\Delta\phi}] \quad \text{Eq. (5)}$$
$$= \cos\left(\frac{\Delta\phi}{2}\right)$$
$$= 2 \cdot \left|\cos\left(\frac{\pi}{2}(4x/\lambda - 1)\right)\right|$$
$$= 2 \cdot |\sin(2\pi x/\lambda)|$$

As can be seen in FIG. 4, the signal amplitude at output1 is maximal for transducer distances of $x=\lambda/4+k\lambda/2$ where k=0, 1, 2, ... In reality, the transducer distance is often less than $\lambda/4$ and thus the signal amplitude from input1 at outputt is down from its maximum at this separation distance. The amplitude of the signal at output1 is adjustable according to the graph of FIG. 4. As an example, with a mud wave velocity of c=1500 m/s and signal frequency f=10 Hz, the wavelength of the signal is $\lambda$=150 m. A distance between transducers detect this wave may be x=15 m=$\lambda$/10. Thus, the amplitude of the signal at output1 SA=1.17*(input1 signal amplitude) and through Eq. (1), the phase difference between path x3 and path x0 is $$\Delta\phi = \frac{2\pi}{\lambda}(x_3 - x_0) = \frac{2\pi}{\lambda}\left(\frac{\lambda}{2} - \frac{\lambda}{10} + n\lambda\right) = \pi - \pi/5.$$

By reducing the distance between transducers to x=5 m, the amplitude of the signal at output1 reduces to SA=0.41*(input1 signal amplitude).

From Eq. (1), for a fixed transducer distance x and at a given frequency, the input signals at input1 and input2 may be completely decoupled by adjusting the delays $x_3$ and $x_0$ ($x_0=x_1+x_2$). In one aspect, the decoupler of the disclosure may decouple the signals not only at one frequency, but also in a frequency band. The signal at output1 is adjustable according to the shape in FIG. 4. In one aspect, bars $x_1$, $x_2$ and x3 provide signal delays through physical means. In another aspect, the signal delay may be provided using electronics, such as through the use of allpass filters which shift the phase of a signal while maintaining the amplitude of the signal.

Figure 5:
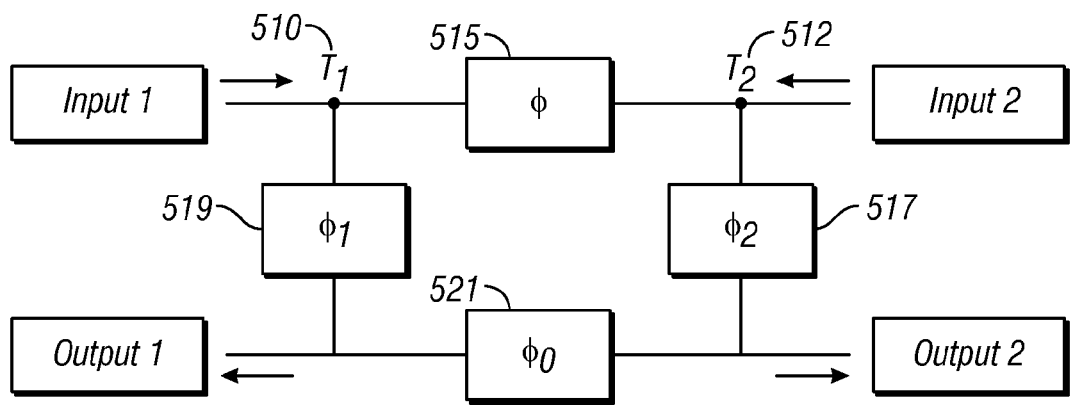
FIG. 5 shows one aspect of a pressure wave decoupler using allpass filters to provide phase delays.

FIG. 5 shows one aspect of a pressure wave decoupler 500 using allpass filters to provide phase delays. Transducers T1 510 and T2 512 are separated by a distance x which is indicated by the corresponding phase shift $\phi$515. $\phi$1 519 represents the phase delay along the path connecting input1 and ouput1. $\phi$2 517 represents the phase delay along the path connecting input2 and output2. $\phi$0 521 represents the phase delay along the path connecting output1 and output2.

In one aspect, the pressure wave decoupler 500 may be used to decouple two waves having the same frequency $f_0$. The time delay of a wave traveling between the two transducers is τ=x/c where c is the wave velocity and x is the separation distance between T1 and T2. The phase shift between T1 and T2 is therefore $$\phi = 2\pi f_0 \tau = 2\pi f_0 \frac{x}{c} \qquad \text{Eq. (7)}$$

The condition of Eq. (1) for decoupling at output1 may be rewritten in terms of the decoupler of FIG. 5 as $$\phi_0+\phi_2-\phi_1-\phi=\pi+2k\pi \; k=\ldots-2,-1,0,1,2,\ldots \qquad \text{Eq. (8)}$$

Using the substitution $\Delta\phi=\phi_2-\phi_1$, then Eq. (7) and Eq. (8) may be combined to obtain $$\phi_0=2\pi(x/c)f_0-\Delta\phi+\pi+2k\pi \; k=\ldots-2,-1,0,1,2,\ldots \qquad \text{Eq. (9)}$$

The signal from input1 arrives at the output1 through one of two paths. Along one path, the signal experiences delays $\phi$, $\phi_2$ and $\phi_0$. Along the other path, the signal experiences delay $\phi$1. The phase difference $\Delta\phi_s$ between these two paths is:

$$\Delta\phi_s=(\phi+\phi_2+\phi_0)-\phi_1=\phi+\phi_0+\Delta\phi \qquad (10)$$

or $$\Delta\phi_s=4\pi(x/c)f_0+\pi+2k\pi \qquad \text{Eq. (11)}$$

From Eq. (11), the phase difference $\Delta\phi_s$ depends only on the distance x between the transducers, the velocity c of the mud wave and on the frequency $f_0$. The signal power at output1 depends on $\Delta\phi_s$. For $\Delta\phi_s=0$, the signal power is maximal, and for $\Delta\phi_s=\pi$, the signal power is minimal. The noise power from input2 is substantially zero at output1 at the considered frequency $f_0$.

From Eq. (8) at frequency $f_0$, output2 is composed of only the noise from input2. When the noise power (input2) is much higher than the signal power (input1), the detected spectrum at output2 may be used to adjust the phase delay $\phi$0. Adjusting the phase delay is useful when the mud wave velocity is not well known.

At output2 the two arriving noise signals from input2 arrive with phase delays of $\phi_2$ and $\phi+\phi_1+\phi_0$. The phase difference of the noise ($\Delta\phi_N$) is then:

$$\Delta\phi_N(f)=(\phi+\phi_1+\phi_0)-\phi_2=2\pi(x/c)f+\phi_0-\Delta\phi \qquad \text{Eq. (12)}$$

The noise power at output2 is minimal at the frequency f when:

$$\Delta\phi_N(f)=\pi+2n\pi \; n=\ldots-2,-1,0,1,2, \qquad \text{Eq. (13)}$$

which leads (from Eqs. (12) and (13)) to $$2\pi(x/c)f+\phi_0-\Delta\phi=\pi+2k\pi \qquad \text{Eq. (14)}$$

Using Eq. (9):

$$2\pi(x/c) + 2\pi(x/c)f_0 - 2\Delta\phi + \pi + 2k\pi = \pi + 2n\pi \qquad \text{Eq. (15)}$$
$$\Rightarrow f = \frac{c}{x}\left[\frac{\Delta\phi}{\pi} + (n-k)\right] - f_0,$$
$$(n-k) = \ldots -2, -1, 0, 1, 2, \ldots$$

For n−k=0 (the first frequency):

$$f = \frac{c}{x} \cdot \frac{\Delta\phi}{\pi} - f_0 \qquad \text{Eq. (16)}$$

Thus, the frequency f at which the signal power is minimal at output2 (minima of the power spectrum of output2) depends linearly on $\Delta\phi$. The wave velocity c may be determined by changing the phase difference $\Delta\phi$ and locating the minima of the power spectrum at output2. Since $\Delta\phi \leq 2\pi$ and c>>x, the frequency f≠$f_0$. The spectral minima of output2 occur at frequency f such that the minimum contains no or little spectral contribution from the pulser signal of $f_0$.

By using three filters as shown in FIG. 5, it is thus possible to combine the filtered outputs of two transducers, each of which is responsive to a first signal and a second signal traveling in an opposite direction to the first signal, and recover an estimate of the first signal and the second signal at a selected frequency. The outputs of the transducers may be defined as third and fourth signals. When used for uplink telemetry, the first signal is a noise signal, such as pump noise, generated at the surface and the second signal is the uplink telemetry signal. For uplink telemetry, the two transducers may be positioned near the surface. For downlink telemetry, the first signal may be a downlink signal, the second signal may be noise generated at the drillbit, and the two transducers may be on the BHA.

Figure 6:
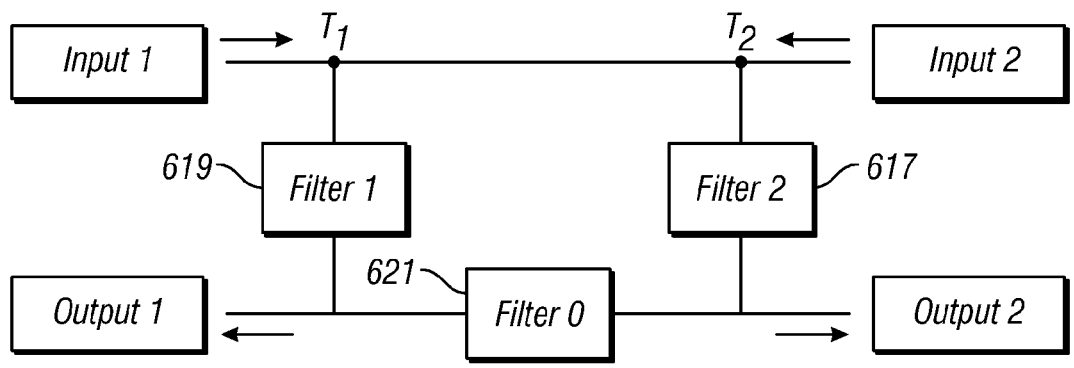
FIG. 6 shows an exemplary implementation of pressure wave decoupler usable over a frequency band that may be tuned.

FIG. 6 shows an exemplary implementation of the decoupler 600 usable over a frequency band to enable an operator to design filters for providing phase delays. Filter0 621 provides delay $\phi$0, filter1 619 provides delay $\phi$1, and filter2 617 provides delay $\phi$2. Eq. (17) below generalizes Eq. (9) to any frequency f and may be used to determine the basic design of the filters (delays):

$$\phi_0(f) = 2\pi\frac{x}{c}f - \Delta\phi + \pi + 2k\pi \qquad \text{Eq. (17)}$$
$$k = \ldots -2, -1, 0, 1, 2, \ldots$$

In the case in which the delays φ1 and φ2 are out of phase:

$$\Delta\phi = \phi_2 - \phi_1 = \pi + 2k\pi \quad \text{Eq. (18)}$$

Since Eq. (17) depends on the phase deviation Δφ and not on absolute values of φ1 and φ2 and since the pulser signal power at output1 is independent of φ1 and φ2, the filters of FIG. 5 may be chosen accordingly.

Figure 7:
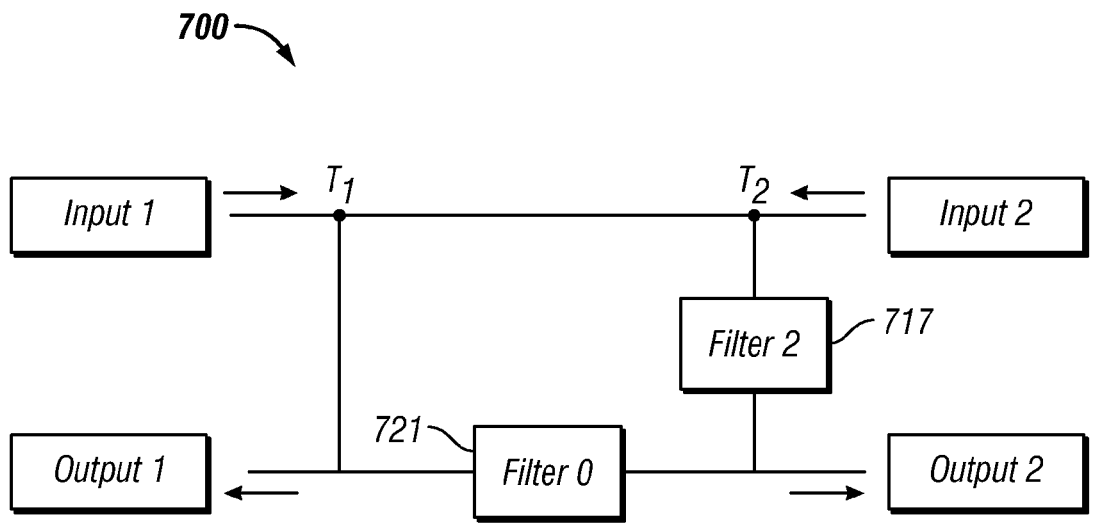
FIG. 7 illustrates another implementation of a decoupler using a simple bypass filter.

FIG. 7 illustrates an exemplary design of a decoupler 700 using φ1=0, for instance, by making Filter1 (619 of FIG. 6) a simple bypass filter. Filter2 may be designed as an allpass filter with a constant phase π:

$$\phi_2 = \pi \quad \text{Eq. (19)}$$

Filter0 721 then provides a linear phase characteristic (phase that is a linear function of frequency) and a constant amplitude over frequency:

$$\phi_0(f) = 2\pi \frac{x}{c} f \quad \text{Eq. (20)}$$

Due to changes in the mud characteristics, the wave velocity generally is not well known and may change during the course of operation. For this reason, the phases of the filters of the decoupler often require changing. In order to update the phase φ0 of filter0 721, it is possible to first change the phase of the allpass filter2. For example, the phase φ2 may be tunable according to the following scheme:

$$\phi_2 = \pi \pm n \cdot \pi/10 \quad n=0, 1, 2, 3, \ldots \quad \text{Eq. (21)}$$

Every time the φ2 is changed, an estimate may be made of the location of the spectral minima of the signal at output2. These minima occur at frequencies given by Eq. (16). When the estimated frequencies and the phase φ2 are known, the Eq. (16) gives an estimate of the wave velocity c. The new calculated value of the wave velocity may be used to update the phase φ0 of the filter0 721. The phases of the filters will thus be as follows:

$$\phi_2 = \pi \quad \text{Eq. (22)}$$

$$\phi_0(f) = 2\pi \frac{x}{c'} f$$

where c' is the new calculated value of the mud velocity.

Figure 8:
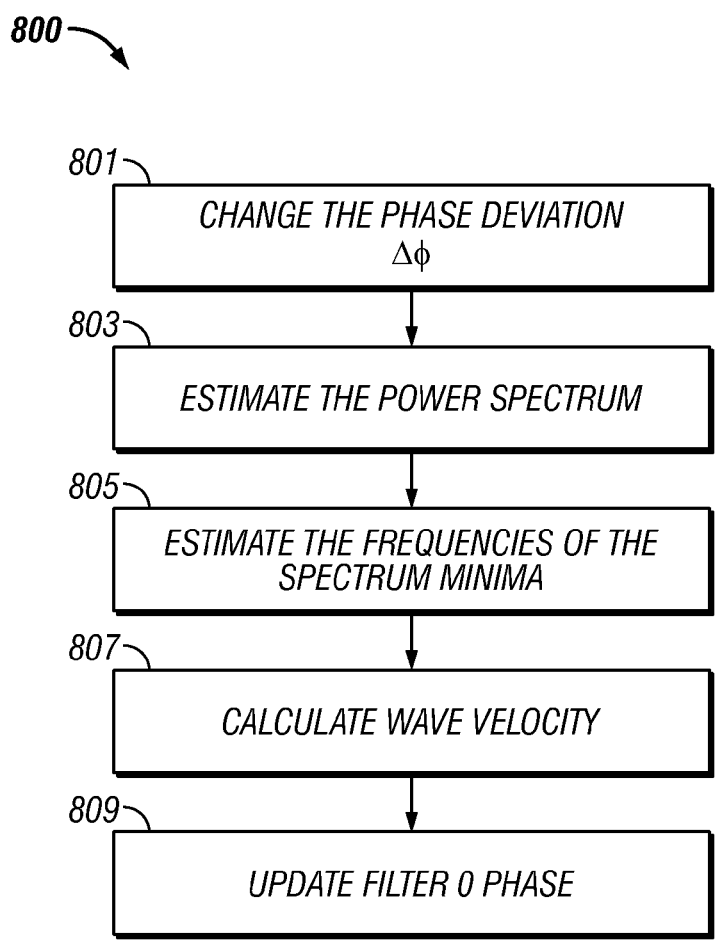
FIG. 8 shows a flowchart for tuning a decoupler described in the present disclosure.

FIG. 8 shows a flowchart 800 for tuning a decoupler of the present disclosure, such as the decoupler of FIG. 7. Such tuning is advantageous in a borehole where mud velocity is not constant. In box 801, the phase deviation Δφ is changed. When φ1 is held constant, Δφ may be changed by changing φ2. An estimate is made of the resultant power spectrum (box 803). In box 805, the frequencies f of the spectrum minima are located. This may be done using Eq. (16). In box 807, the wave velocity c' is calculated. In box 809, the filter0 coefficients φ0 are updated according to the calculated wave velocity c' to change the phase of the filter.

Figure 9:
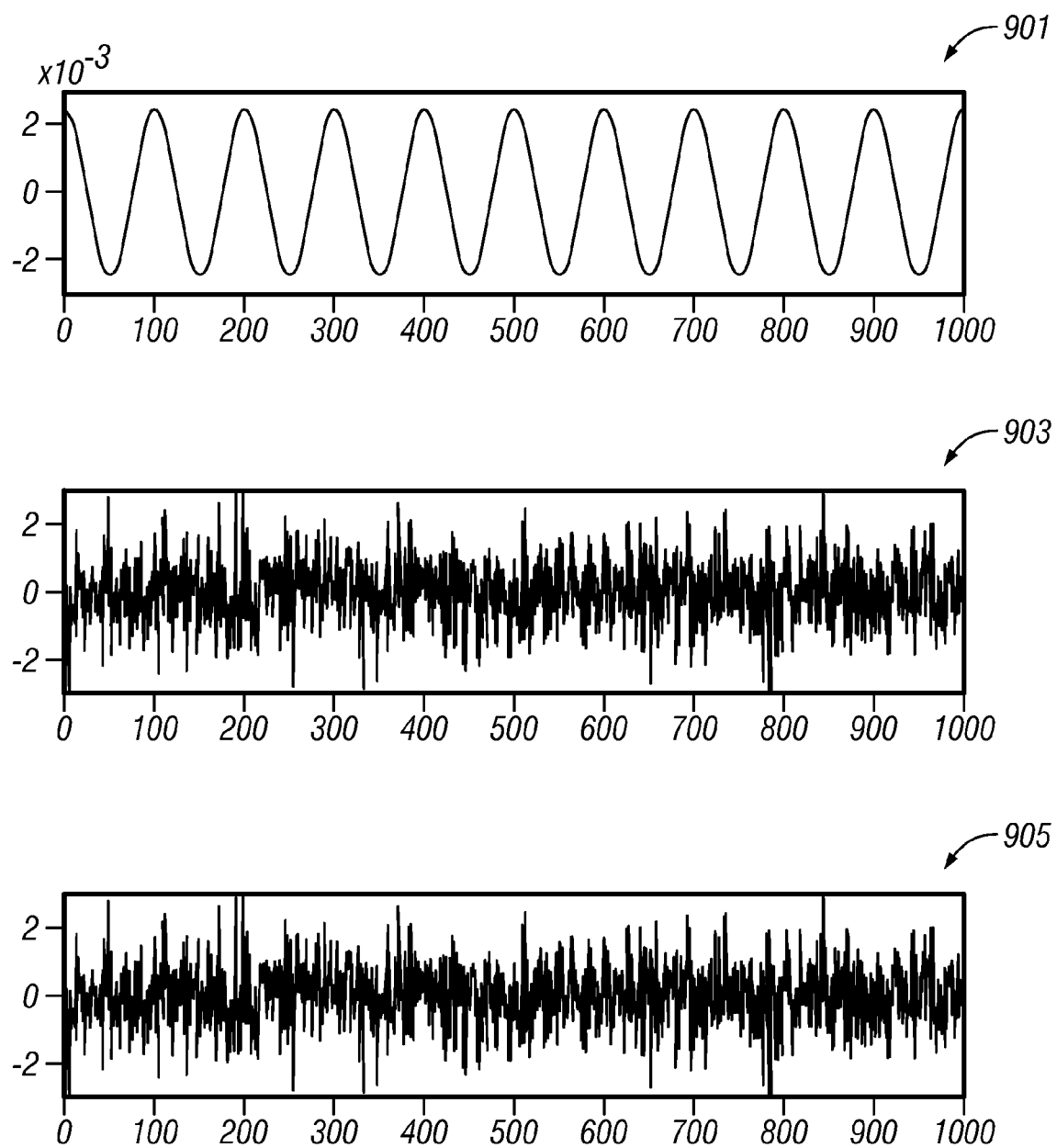
FIG. 9 shows exemplary pulser (source) signals and pump signals (noise)

FIG. 9 shows a sample of source and noise signals that may be decoupled using the decoupler of FIG. 7. The signals are provided over a one second time interval. Time is measured along the abscissa and power is measured along the ordinate axis. The simulation uses a cosine wave with a frequency of 10 Hz to represent the pulser signal and Gaussian noise to represent pump noise. FIG. 9 shows respectively, the pulser signal 901, the pump noise 903 and the superposition of the pulser signal and the pump noise 905. The signal power is small compared to the noise power.

Figure 10:
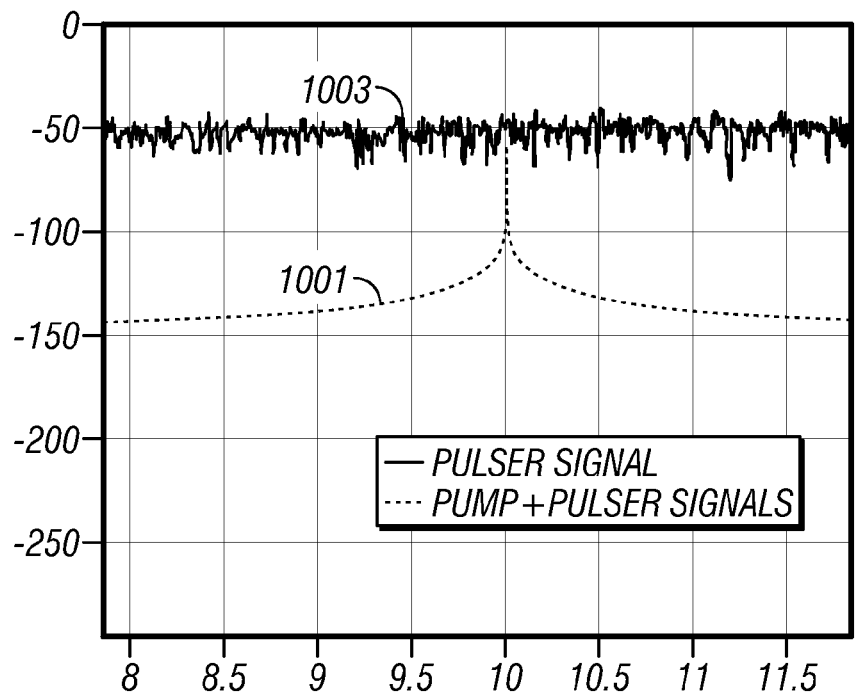
FIG. 10 shows the power spectra of the pulser signal and of the combined pulser signal and noise.
Figure 11:
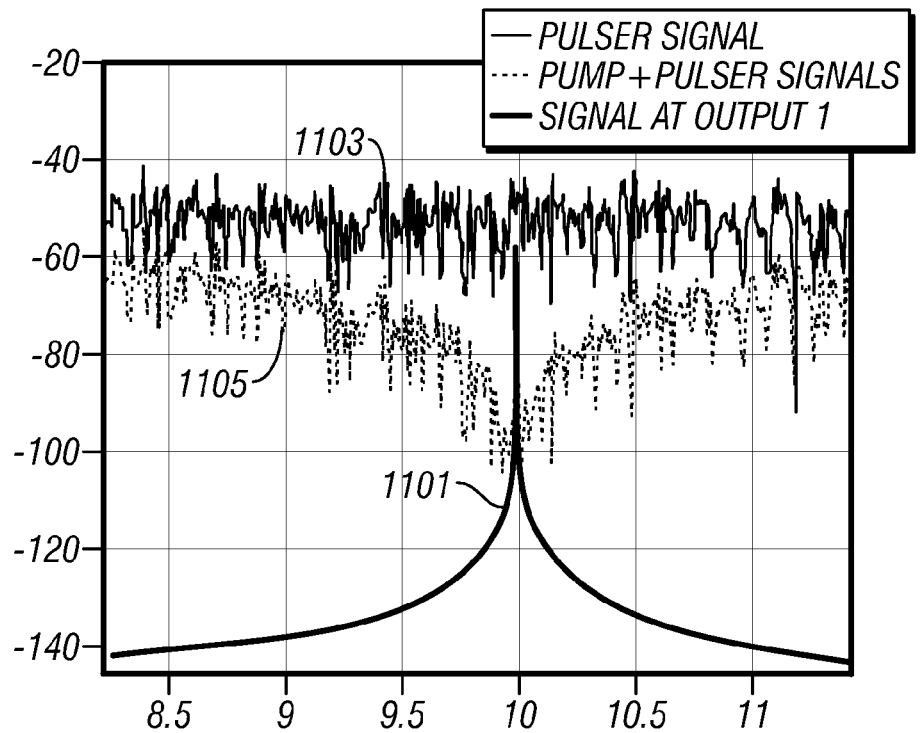
FIG. 11 shows various power spectra obtained affected using the decoupler.
Figure 12:
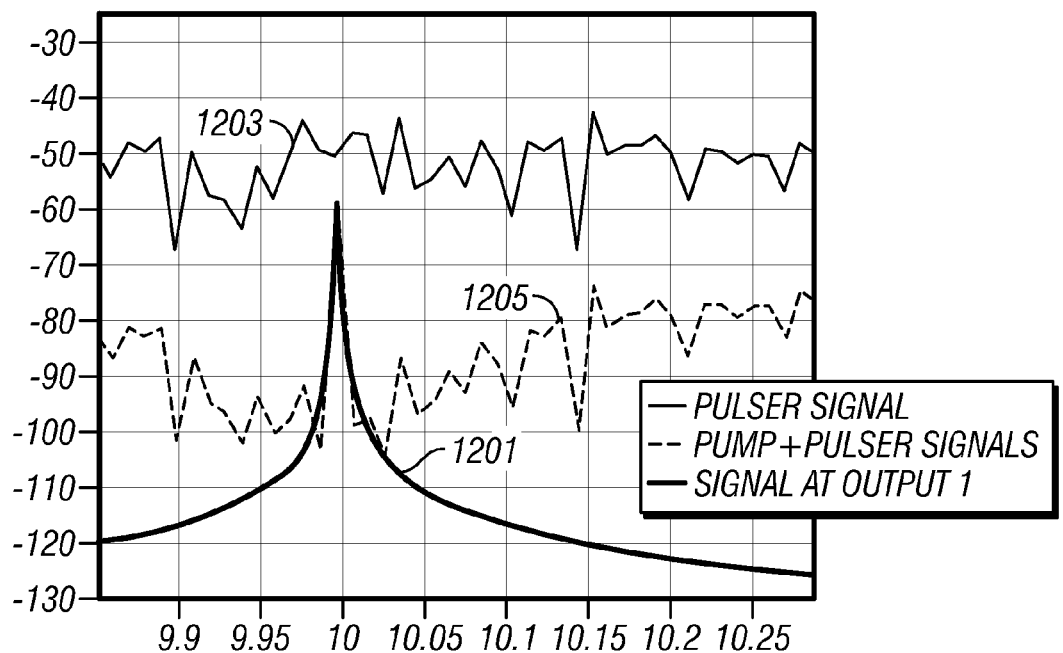
FIG. 12 shows the power spectra of FIG. 11 in a small band around the central frequency of the pulser signal.

FIG. 10 shows the power spectrum of the signal 1001 and the combined signal and noise power spectrum 1003. Power is shown on the ordinate and frequency is shown on the abscissa. The spectrum is shown around the central frequency of f=10 Hz. The power of the signal is generally less than then power of the noise and reaches the a peak at the frequency f=10 Hz. FIG. 11 shows various power spectra obtained due to using the decoupler described above in FIG. 7 on the combined signal and noise. The pulser signal 1101 is shown peaking at f=10 Hz. The combined signal and noise spectrum 1103 is constant over the represented frequencies. The decoupled signal 1105 shows that the spectrum reduces its power at the frequency f=10 Hz at which the spectrum noise is decoupled from the pulser signal. FIG. 12 shows the power spectra of FIG. 11 in a small band around the central frequency of the pulser signal. FIG. 12 shows the spectra of a pulser signal 1201, pump and pulser (signal and noise) 1203, and the signal measured at output1 1205.

The exemplary generalized decoupler of FIG. 6 may be used to compensate for any attenuation between T1 and T2 and for distortion caused by the transducers. In general, there is attenuation of the mud channel between the two transducers and the transfer function of the transducer is not ideal and shows some frequency dependent phase and amplitude distortion. Filter1 619 and filter2 617 may be adjusted to compensate for any attenuation and distortion. In one aspect, filter0 621 may be an allpass filter with the linear phase relation:

$$\phi_0(f) = 2\pi \frac{x}{c} f + \pi$$

To estimate the wave velocity, the phase $\phi_2$ of the filter2 617 may be altered and the spectrum minima then detected at output2 using the method outline in the flowchart of FIG. 8.

Figure 13:
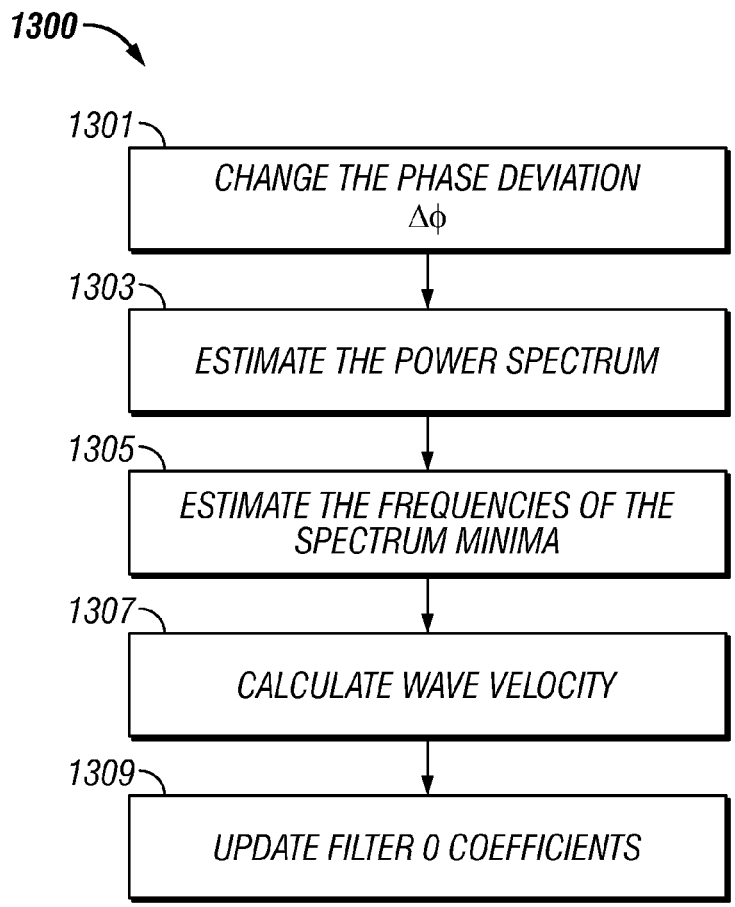
FIG. 13 show shows a flowchart of an alternate embodiment of the disclosure.

FIG. 13 shows a flowchart 1300 for tuning a decoupler of the present disclosure, such as the decoupler of FIG. 7. This implementation accounts for the fact that the attenuation of the mud channel between the two transducers is not zero. and that the transfer function of the sensor itself is not ideal and shows some frequency-dependent phase and amplitude distortion. In box 1301, the phase deviation Δφ is changed. When φ1 is held constant, Δφ may be changed by changing φ2. An estimate is made of the resultant power spectrum (box 1303). In box 1305, the frequencies f of the spectrum minima are located. This may be done using Eq. (16). In box 1307, the wave velocity c' is calculated. In box 1309, the filter0 coefficients φ0 are updated according to the calculated wave velocity c' to change the coefficients of the filter to adjust the amplitude and the phase of the filter.

The processing of the data may be done by a downhole processor to give corrected measurements substantially in real time. Alternatively, the measurements could be recorded downhole, retrieved when the drillstring is tripped, and processed using a surface processor. The term "processor" as used here is intended Implicit in the control and processing of the data is the use of a computer program on a suitable machine readable medium that enables the processor to perform the control and processing. The machine readable medium may include ROMs, EPROMs, EEPROMs, Flash Memories and Optical disks.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of communicating through a fluid in a borehole between a first location and a second location, the method comprising:
   producing a first signal at the first location and a second signal at the second location, the first signal and the second signal traveling in opposite directions between a first position and a second position in the borehole;
   measuring a third signal at the first position indicative of the first and second signals;
   measuring a fourth signal at the second position indicative of the first and second signals; and
   using a result of filtering the third signal by a first filter with a result of filtering the fourth signal by a second filter and a third filter for estimating a value of the first signal at at least one frequency at a first output
   wherein the first filter, the second filter and the third filter are selected based upon a result at a second output of applying the first filter and the third filter to the third signal and applying the second filter to the fourth signal wherein the third filter has a phase shift substantially equal to $\pi$.

2. The method of claim 1 further comprising estimating the value of the second signal by applying the first filter and the second filter to the third signal and applying the third filter to the fourth signal.

3. The method of claim 1 wherein the at least one frequency further comprises a plurality of frequencies defining a frequency band.

4. The method of claim 2 wherein the second filter has a phase that is substantially a linear function of frequency.

5. The method of claim 1 wherein the first and second positions are at or near a surface location in the borehole, the second signal comprises a pump noise and the first signal comprises an uplink telemetry signal.

6. The method of claim 1 wherein the first and second positions are on a bottomhole assembly, the first signal comprises a downlink telemetry signal and the second signal comprises drilling noise.

7. An apparatus for communicating through a fluid in a borehole between a first location and a second location, the apparatus comprising:
   a first signal source configured to produce a first signal at the first location and a second signal source configured to produce a second signal at the second location, the first signal and the second signal traveling in opposite directions between a first position and a second position in the borehole;
   a first transducer configured to produce a third signal at the first position indicative of the first and second signals;
   a second transducer configured to produce a fourth signal at the second position indicative of the first and second signals; and
   a processor configured to:
   use a result of filtering the third signal by a first filter with a result of filtering the fourth signal by a second filter and a third filter to estimate a value of the first signal at at least one frequency at a first output wherein the first filter the second filter and the third filter are selected based upon a result at a second output of applying the first filter and the third filter to the third signal and applying the second filter to the fourth signal wherein the third filter has a phase shift substantially equal to $\pi$.

8. The apparatus of claim 7 wherein the processor is further configured to estimate a value of the second signal further by further applying the first filter and the second filter to the third signal and applying the third filter to the fourth signal.

9. The apparatus of claim 7 wherein the processor is configured to estimate the first and second signals at a plurality of frequencies.

10. The apparatus of claim 7 wherein the second filter has a phase that is substantially a linear function of frequency.

11. The apparatus of claim 7 wherein the first and second positions are at or near a surface location in the borehole, the second signal source comprises a pump and the first signal source comprises a valve which generates an uplink signal.

12. The apparatus of claim 7 wherein the first and second positions are on a bottomhole assembly, the first signal source comprises a downlink telemetry signal and the second signal source comprises a rotating drillstring.

* * * * *